(12) United States Patent
Hall et al.

(10) Patent No.: US 12,718,249 B2
(45) Date of Patent: Aug. 25, 2026

(54) SYSTEMS AND METHODS FOR A USER INTERFACE OVERLAY FOR FRAUD DETECTION ACROSS ACCOUNTS

(71) Applicant: Mitek Systems, Inc., San Diego, CA (US)

(72) Inventors: John Hall, San Diego, CA (US); Yuriy Okrugin, San Diego, CA (US); Troy Walker, San Diego, CA (US); James Watts, San Diego, CA (US); Fred Fernandez, San Diego, CA (US)

(73) Assignee: Mitek Systems, Inc., San Diego, CA (US)

(*) Notice: Subject to any disclaimer, the term of this patent is extended or adjusted under 35 U.S.C. 154(b) by 0 days.

(21) Appl. No.: 19/009,837

(22) Filed: Jan. 3, 2025

(65) Prior Publication Data

US 2025/0225525 A1 Jul. 10, 2025

Related U.S. Application Data

(60) Provisional application No. 63/618,245, filed on Jan. 5, 2024, provisional application No. 63/618,238, filed on Jan. 5, 2024.

(51) Int. Cl.
*G06Q 20/04* (2012.01)
*G06Q 20/40* (2012.01)
(Continued)

(52) U.S. Cl.
CPC ....... *G06Q 20/4016* (2013.01); *G06Q 20/042* (2013.01); *G06V 10/44* (2022.01);
(Continued)

(58) Field of Classification Search
CPC .. G06Q 20/4016; G06Q 20/042; G06V 10/44; G06V 10/751; G06V 30/18019;
(Continued)

(56) References Cited

U.S. PATENT DOCUMENTS 12,039,504 B1 * 7/2024 Foster ................ G06Q 20/0425
12,260,700 B1 * 3/2025 Bueche, Jr. ............. G06T 7/194
(Continued)

OTHER PUBLICATIONS

Extended European Search Report “EESR” mailed Nov. 24, 2025 in European Application No. 25183207.7, 5 pages.
(Continued)

*Primary Examiner* — Clifford B Madamba
(74) *Attorney, Agent, or Firm* — Procopio, Cory, Hargreaves & Savitch LLP

(57) ABSTRACT

A method comprising using at least one hardware processor to: receiving a new incoming check image associated with an account; extracting from the incoming check its features, wherein the features are associated with a plurality of detectors; comparing the features with corresponding features associated with profile check images stored in a CIR; developing a fraud score based on the comparisons, for each of the plurality of detectors; retrieving information related to one or more other accounts linked with the account related to and then either update or develop the fraud score considering the retrieved information; displaying via a user interface, the new incoming check image with at least one highlighted feature, based on business rules, along with confidence indicators for the at least one highlighted feature that illustrate the risk, based on the associated fraud score, for the at least one highlighted feature; and providing, via the user interface, inputs that allow a reviewer to quickly approve or decline the new incoming check image.

10 Claims, 12 Drawing Sheets

(51) Int. Cl.

| | |
|---|---|
| ***G06V 10/44*** | (2022.01) |
| ***G06V 10/75*** | (2022.01) |
| ***G06V 10/82*** | (2022.01) |
| ***G06V 30/18*** | (2022.01) |
| ***G06V 30/19*** | (2022.01) |
| ***G06V 30/22*** | (2022.01) |
| ***G06V 30/42*** | (2022.01) |

(52) U.S. Cl.
CPC ...... *G06V 10/751* (2022.01); *G06V 30/18019* (2022.01); *G06V 30/19013* (2022.01); *G06V 30/22* (2022.01); *G06V 30/42* (2022.01); *G06V 10/82* (2022.01)

(58) Field of Classification Search
CPC .. G06V 30/19013; G06V 30/22; G06V 30/42; G06V 10/82
USPC ........................................................... 705/44
See application file for complete search history.

(56) References Cited

U.S. PATENT DOCUMENTS

| | | | | |
|---|---|---|---|---|
| 2020/0184211 | A1 | 6/2020 | Fowles | |
| 2022/0366513 | A1* | 11/2022 | Vadlamudi ............ | H04L 9/3247 |
| 2024/0144204 | A1* | 5/2024 | Kolavennu .......... | G06Q 20/042 |

OTHER PUBLICATIONS

Nathaniel Merrill et al: "CALC2.0: Combining Appearance, Semantic and Geometric Information for Robust and Efficient Visual Loop Closure",Arxiv.org, Cornell University Library, 201 Olin Library Cornell University Ithaca, NY 14853,Oct. 30, 2019 (Oct. 30, 2019), XP081523370, 8 pages.

Kazuki Nozawa et al: "Stable Two View Reconstruction Using the Six-Point Algorithm",Nov. 5, 2012 (Nov. 5, 2012), Computer Vision ACCV 2012, Springer Berlin Heidelberg, Berlin, Heidelberg, pp. 122-135, XP047027176, 14 pages.

Official Action mailed Dec. 18, 2025 in U.S. Appl. No. 19/009,817, 16 pages.

* cited by examiner

Depositor Validation POC/ Data Example

*Use case provided by Top 5 FI to Match Payer Line To Depositor. Account name provided by FI.*

95%

Validated To
Depositor Name

SYSTEMS AND METHODS FOR A USER INTERFACE OVERLAY FOR FRAUD DETECTION ACROSS ACCOUNTS

RELATED APPLICATIONS INFORMATION

This application claims priority to U.S. Provisional Patent Application 63/618,245 filed on Jan. 5, 2024, entitled, “SYSTEMS AND METHODS FOR A USER INTERFACE OVERLAY FOR FRAUD DETECTION” and U.S. Provisional Patent Application 63/618,238 filed on Jan. 5, 2024, entitled, “SYSTEMS AND METHODS FOR A USER INTERFACE OVERLAY FOR FRAUD DETECTION ACROSS ACCOUNTS”, both of which are incorporated herein by reference as if set forth in full.

BACKGROUND

Field of the Invention

The embodiments described herein are generally directed to fraud detection, and more particularly to combat check fraud risk and process checks with greater accuracy and efficiency.

Description of the Related Art

Banks and other businesses have become increasingly interested in electronic processing of check and other financial documents in order to expedite processing of these documents. Users can scan a copy of the document using a scanner or copier to create an electronic copy of the document that can be processed instead of a hardcopy original, which would otherwise need to be physically sent to the recipient for processing. For example, some banks can process digital images of checks and extract check information from the image needed to process the check without requiring that the physical check be routed throughout the bank for processing.

Unfortunately, these capabilities have also led to new forms of fraud, where fraudsters, e.g., attempt to deposit fake checks into their accounts. Accordingly, conventional banking systems that are configured to process electronic images of checks now typically incorporate a database that stores Check Identity Records (CIRs). Information from a user’s check images are extracted and stored in the CIR, known also as a check profile Such information can include:

Detectors

| Test Name | Compare Location | Compare Contents | Brief Description |
|---|---|---|---|
| Courtesy Amount Field | x | | Compares the location of the CAR field to established profile Values |
| Courtesy Sign | x | Image Comparison | Compares the location and image of the Courtesy Amount Sign to established profile Values |
| Legal Amount Field | x | | Compares the location of the LAR field to established profile Values |
| Payee Name Field | x | | Compares the location of the Payee Name field to established profile Values |
| TO THE ORDER OF keyword | x | Image Comparison | Compares the location and snippet of keyword PAY TO THE ORDER OF field to established profile Values |
| Date Field | x | | Compares the location of the Date field to established profile Values |
| Date keyword | x | Image Comparison | Compares the location and pre-printed the keyword Date to established profile Values |
| Payor Address Block | x | | Compares the location of the Payor address block to established profile Values |
| Check Number Field | x | | Compares the location of the Check Number field to established profile Values |
| Reduced Image of Whole Check | | Image Comparison | Reduces the size of the overall check image and compares the overall image to established profile Values |
| Structural Layout | x | | Compares the relative location of pre-printed lines on the checks vs overall established profile Values |
| Comparison of Check Numbers | | | Compares the check number in the bottom code line to the check number on the top right corner of the check |
| LAR Handwriting Style | | Style Comparison | Compares the LAR Handwriting style of the check to established profile Values for certain characters |
| Payor Name | | Image Comparison | Compares the snippet of Payor Name to established profile Values |
| Signature Detection | | Image Comparison | Compares the Payor Signature on the front of the check to established profile Values |
| MICR Line | x | | Compares the location of the MICR line to established profile Values |

-continued

| Test Name | Compare Location | Compare Contents | Brief Description |
|---|---|---|---|
| CAR/LAR Difference | | | Compares the CAR value and the LAR value on the check to see if they match |
| Payee Name Handwriting Style | | Style Comparison | Compares the Payee name handwriting style on the check to established profile Values |

The process is illustrated in FIG. 6, which is described below.

The problem with conventional CIR approaches is that the CIR is static and therefore the confidence of the fraud detection is compromised over time.

Other issues with conventional check fraud detection systems include: Image quality and that can be a risk to the ability to produce the best possible results. The system is able to detect image quality and determine based on quality conditions that may impact the ability to detect fraud and ensure these items get scored but do not get included into a CIR if check images are too light, too dark, skewed, or have some level of redaction, the results will most likely be degraded, especially for data extraction. Low image resolution, below 200 Dot Per Inch (DPI) would be risk to a software's ability to read it. There can also be image comparison risks. For the image comparison, it can be beneficial for the CIR to contain at least 5 images before fraud scores are incorporated into fraud alerting processes. Profiles with at least 10 images perform even better and will usually generate fewer false positives. For accounts with multiple check stock patterns, it can be preferable that the account profile contain a representative sample of each unique check pattern.

Some check fraud detection systems may not be usable on non-US bank checks. The fraud detection model can be trained on country/language specific check images and characters. The model will therefore not perform well on images other than the country/language it was trained on, even if the language is the same or similar.

Results may be inaccurate due to issues with the quality of check images, bad image resolutions when image read is skewed or the customer redacts certain portions of the remittance coupon and check, legibility of handwriting text and quality of any machine printed text. Conventional systems/approaches also lack an overlay or compensating controls.

SUMMARY

Accordingly, systems, methods, and non-transitory computer-readable media are disclosed for fraud detection.

In an embodiment, a method comprising using at least one hardware processor to: receiving a new incoming check image associated with an account; extracting from the incoming check its features, wherein the features are associated with a plurality of detectors; comparing the features with corresponding features associated with profile check images stored in a CIR; developing a fraud score based on the comparisons, for each of the plurality of detectors; retrieving information related to one or more other accounts linked with the account related to and then either update or develop the fraud score considering the retrieved information; displaying via a user interface, the new incoming check image with at least one highlighted feature, based on business rules, along with confidence indicators for the at least one highlighted feature that illustrate the risk, based on the associated fraud score, for the at least one highlighted feature; and providing, via the user interface, inputs that allow a reviewer to quickly approve or decline the new incoming check image.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for fraud detection.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

Infrastructure

Figure 1:
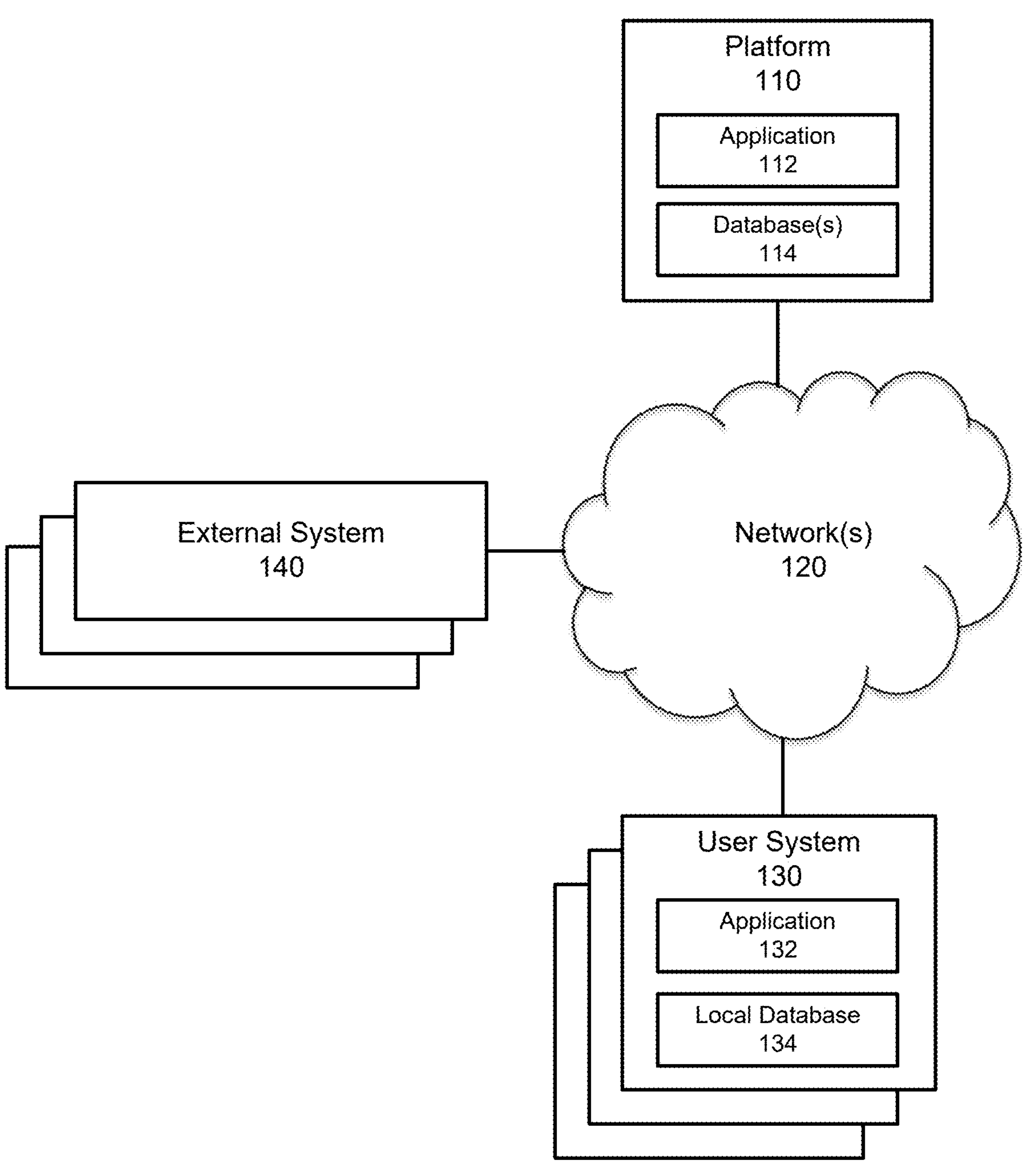
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various processes, methods, functions, and/or software modules described herein. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 130 may comprise or be communicatively connected to a client application 132 and/or one or more local databases 134.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. It should be understood that platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, MongoDB™, DynamoDB™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from user system(s) 130 and/or external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

Example Processing Device

Figure 2:
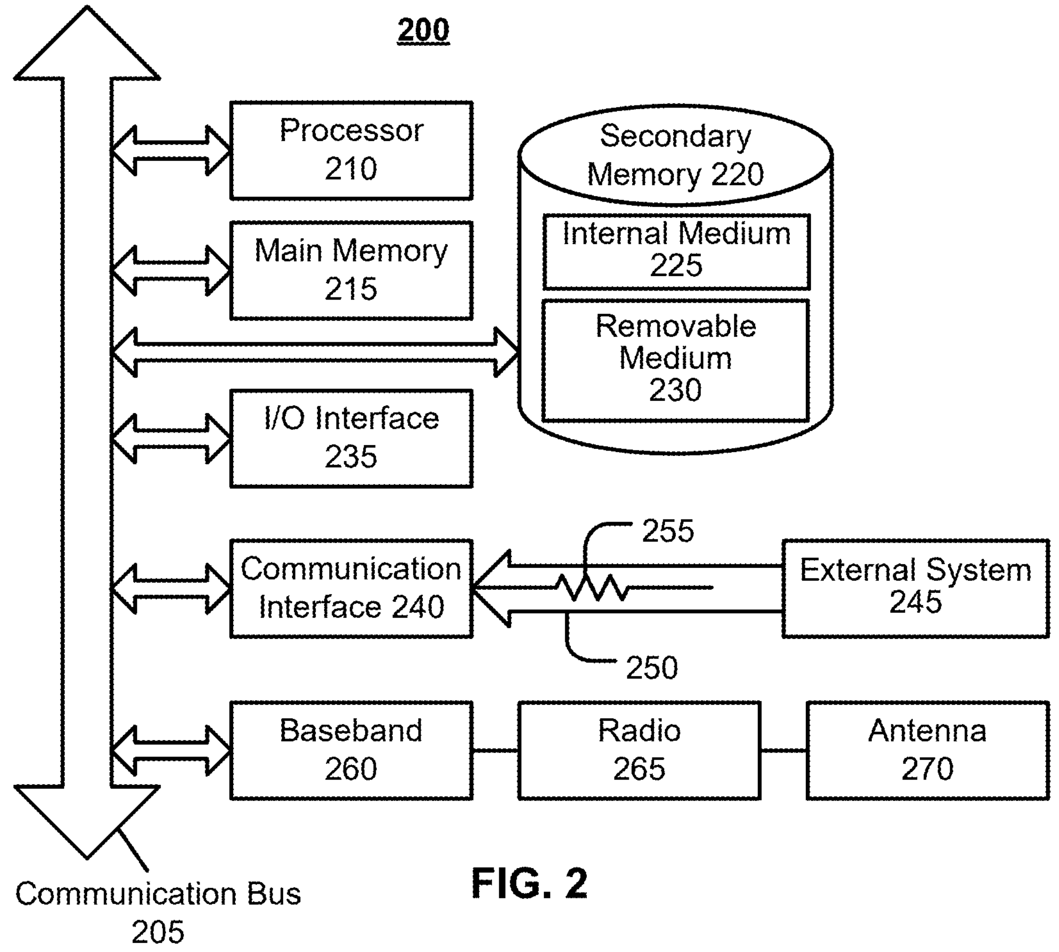
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the processes, methods, or functions (e.g., to store and/or execute the software) described herein, and may represent components of platform 110, user system(s) 130, external system(s) 140, and/or other processing devices described herein. System 200 can be any processor-enabled device (e.g., server, personal computer, etc.) that is capable of wired or wireless data communication. Other processing systems and/or architectures may also be used, as will be clear to those skilled in the art.

System 200 may comprise one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 210. Examples of processors which may be used with system 200 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 may comprise main memory 215. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 200 may comprise secondary memory 220. Secondary memory 220 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 200. The computer software stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may include an internal medium 225 and/or a removable medium 230. Internal medium 225 and removable medium 230 are read from and/or written to in any well-known manner. Internal medium 225 may comprise one or more hard disk drives, solid state drives, and/or the like. Removable storage medium 230 may be, for example, a magnetic tape drive, a compact disc (CD) drive, a digital versatile disc (DVD) drive, other optical drive, a flash memory drive, and/or the like.

System 200 may comprise an input/output (I/O) interface 235. I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

System 200 may comprise a communication interface 240. Communication interface 240 allows software to be transferred between system 200 and external devices (e.g. printers), networks, or other information sources. For example, computer-executable code and/or data may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 240 is generally in the form of electrical communication signals 255. These signals 255 may be provided to communication interface 240 via a communication channel 250 between communication interface 240 and an external system 245 (e.g., which may correspond to an external system 140, an external computer-readable medium, and/or the like). In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 215 and/or secondary memory 220. Computer-executable code can also be received from an external system 245 via communication interface 240 and stored in main memory 215 and/or secondary memory 220. Such computer-executable code, when executed, enable system 200 to perform the various functions of the disclosed embodiments as described elsewhere herein.

In an embodiment that is implemented using software, the software may be stored on a computer-readable medium and initially loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

System 200 may comprise wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is communicatively coupled with processor(s) 210, which have access to memory 215 and 220. Thus, software can be received from baseband processor 260 and stored in main memory 210 or in secondary memory 220, or executed upon receipt. Such software, when executed, can enable system 200 to perform the various functions of the disclosed embodiments.

2. Process Overview

Embodiments of processes for fraud detection will now be described in detail. It should be understood that the described processes may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Check Fraud Model

Certain embodiments described herein include a model that assesses image differences between, e.g., a deposited check and known checks for a given account. In certain embodiments, the system can provide scores intended to identify differences or the likelihood that a check is fraudulent or counterfeit. The model output can be the risk scoring, e.g., in a range from 0 to 1000 where a higher score indicates that the image being scored has differences from the check profile built from previous images. The model outputs the scores based on comparison of the image being scored with best match (best candidate) check image from the CIR, known as Check profile. The higher the score the more likely that image has differences from previously processed best candidate check images. Along with the image scores, the system can be configured to provide OCR/extraction results for the key deposit items on the check, e.g., account, amount, payor, check date, serial number, etc.

2.1.1 Overall Framework or Design 2.1.1. (a) Typical Application Flow

Figure 3:
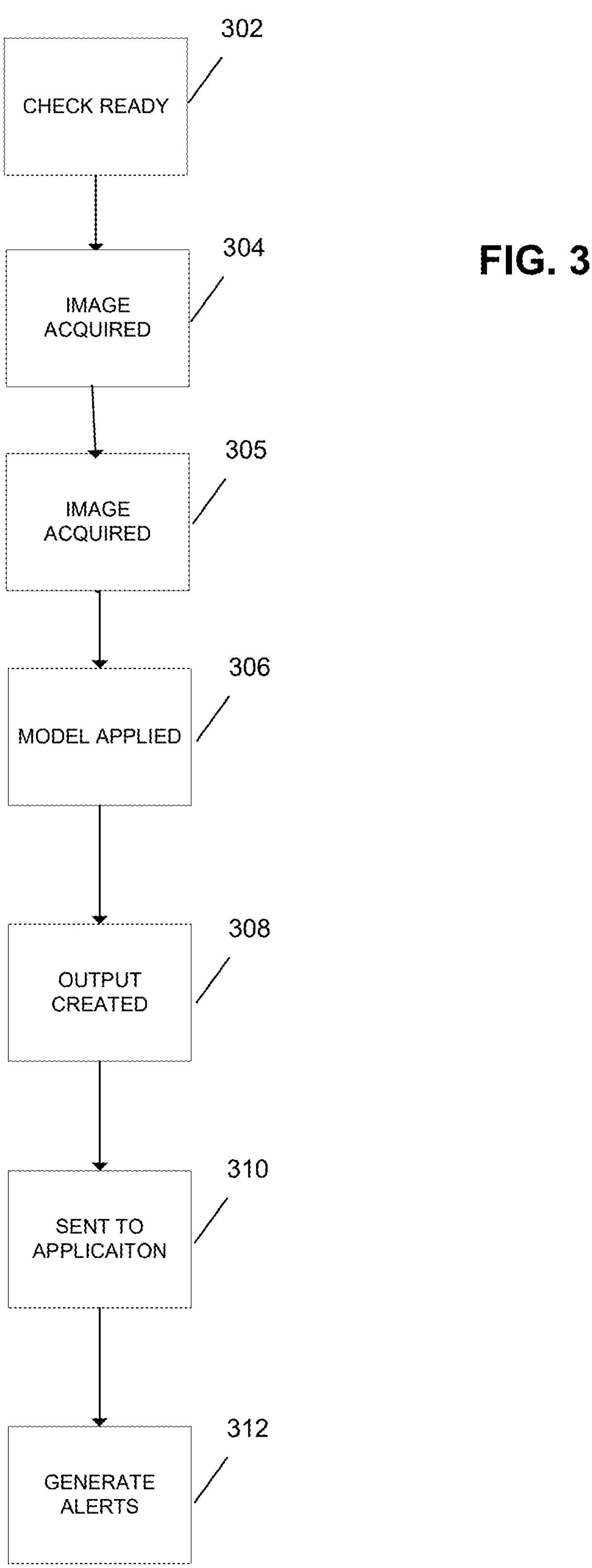
FIG. 3 illustrates an example process for fraud detection, according to an embodiment.

While the implementation to leverage the results ultimately lies with each customer, a typical processing flow can look like that depicted in FIG. 3. First as illustrated, the process can start with a check to be imaged in step 302. In step 304, an image of the check is captured or created. In step 305, Image Quality Analysis (IQA) can occur, and in step 306, the check image is run through the model, which then produce results as described, including the probability score in step 308. The results can then be pushed to the customer application in step 310, which can produce business alerts in accordance with the business logic set up by the customer in step 312.

2.1.1. (b) Fraud Detection Architectural Flow

Figure 4:
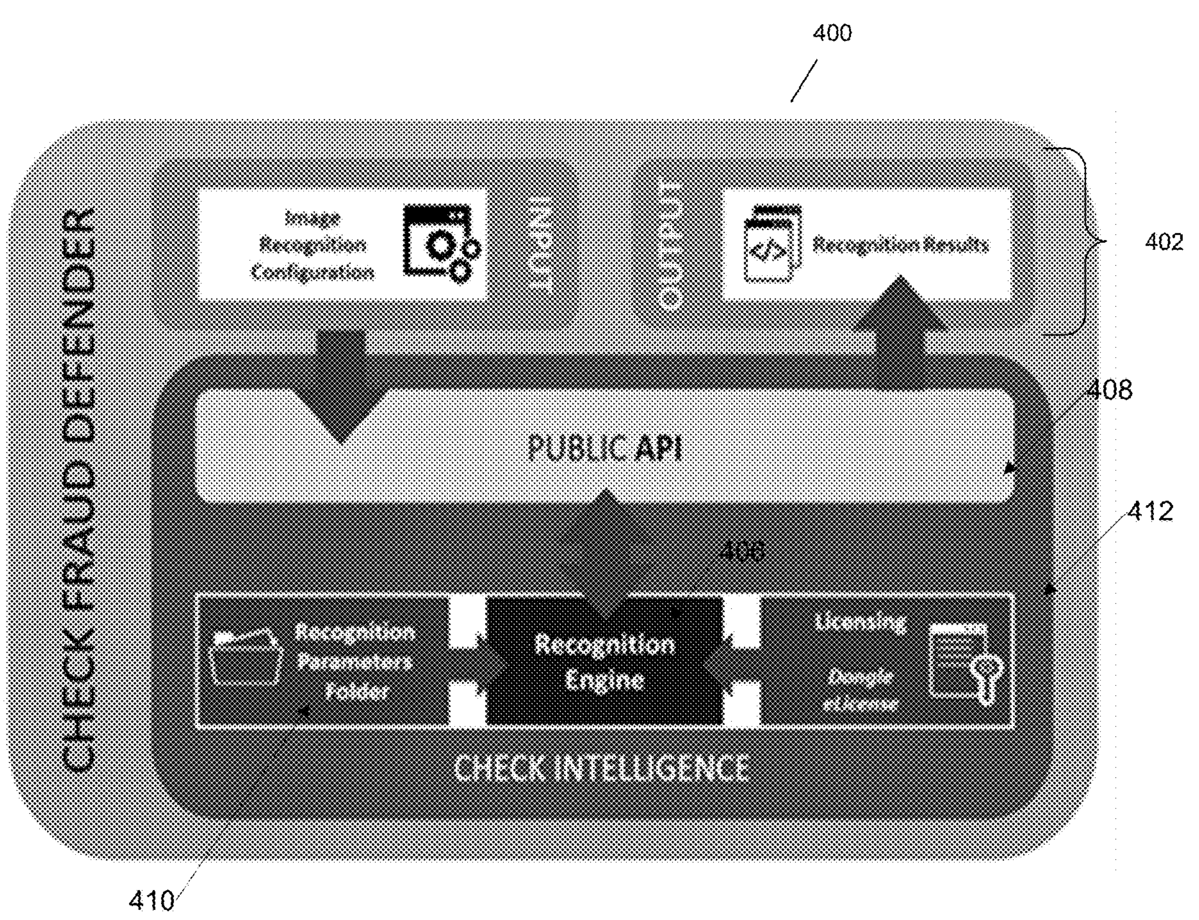
FIG. 4 illustrates an example customer implementation of a fraud detection system, according to an embodiment.

FIG. 4, is a diagram illustrating an example customer implementation of a fraud detection system 400 configured in accordance with the systems and method described herein. As can be seen, system 400 comprises a front end, user application 402 that comprises image recognition configuration 404 that can dictate recognition parameters 410 in a backend 412. Images can then be sent to a back end recognition engine 406 via a portal 408 to be analyzed in accordance with the parameters 410 by extracting information and recognizing that information suing various techniques. In certain embodiments, the character recognizer 406 can comprise four OCR engines (not shown) that recognize segmented character images. Then, OCR results are integrated to obtain final scores of character classes (step 308). All four OCR engines can be neural networks that estimate posterior class probabilities but use different feature sets. A neural network integrator (not shown) can be configured to combine the results of individual OCR engines and produce final class probability estimates. The neural network of the integrator can have the same architecture as the neural networks of OCR engines.

In certain embodiments, in addition to four OCR neural network engines, system 400 can be configured to use a recurrent neural network(s) (not shown) for handwritten and printed data as well as convolutional neural network(s) (not shown) for handwritten data analysis.

In certain embodiments of system 400, a recognition task is solved by several complementary algorithms, with the results being integrated based on the maximum output information criterion, e.g., both log-linear combination rules and neural networks as integrators.

The extraction processing is essentially a probabilistic system, this means that the recognition modules are all soft classifiers. Each module does not produce a single (hard) decision, but a list of possible decisions (candidates) ordered by decreasing confidence scores.

Figure 5:
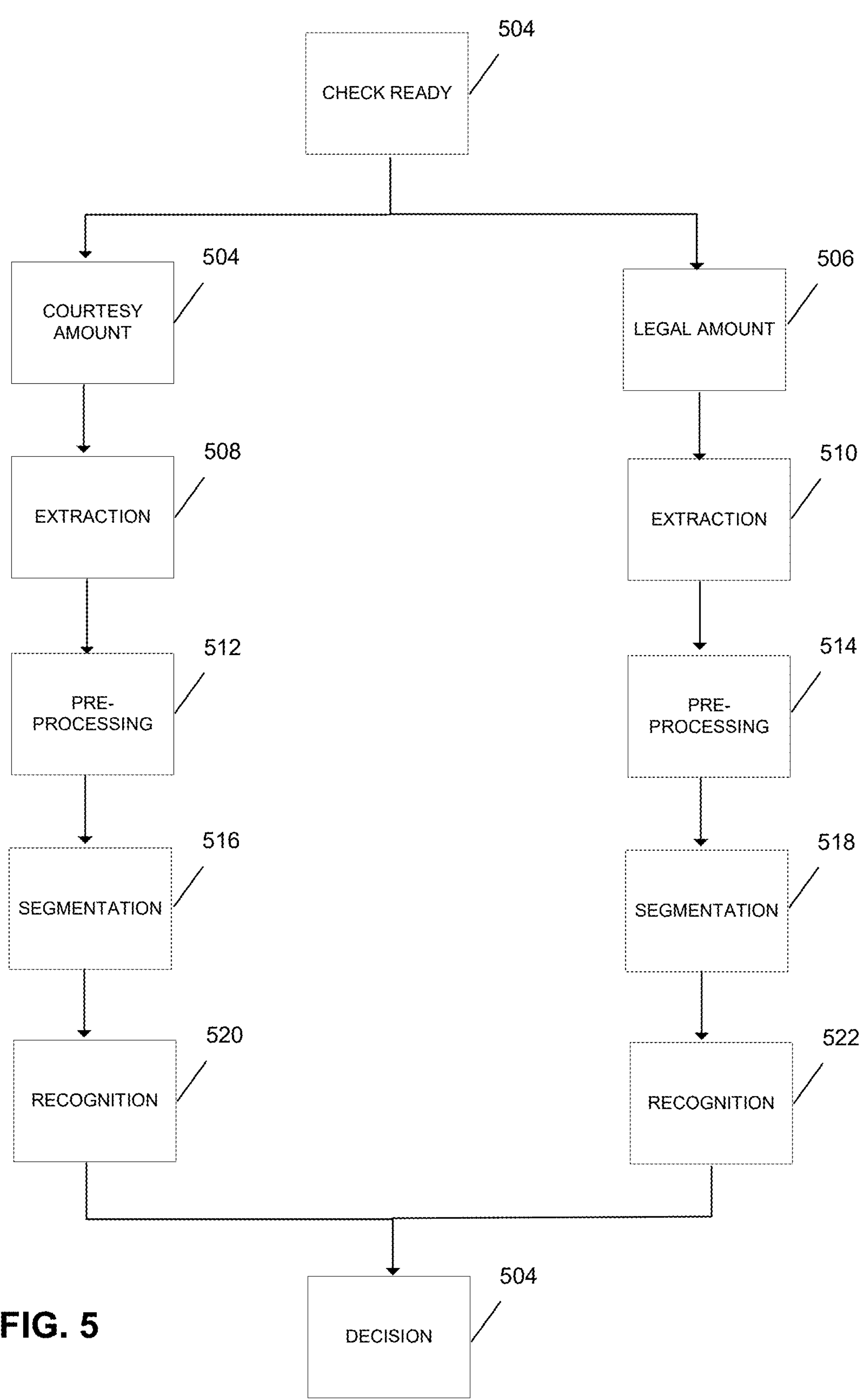
FIG. 5 illustrates an example customer implementation of a fraud detection system, according to an embodiment.

FIG. 5 is an example process for amount recognition to illustrate the process. Starting from a binary image of the check, two recognition chains analyze the image in order to recognize the amount in step 502. While the first chain analyzes the courtesy amount in step 504, the second chain deals with the legal amount in step 506, thereby taking advantage of the redundancy between the two amount fields.

For both chains, the recognition process is divided into 5 steps:

- Extraction of the image parts containing the amount (508, 510);
- Preprocessing of the extracted amount images (512, 514);
- Segmentation of the courtesy amount and legal amount (516, 518);
- Recognition of characters, words and amounts (520, 522); and
- Decision (524).

For the extraction of data from images, a combination of OCR, ICR (Intelligent Character Recognition) and IWR (Intelligent Word Recognition) technologies can be used. Handwritten words recognized by use of IWR technology while OCR and ICR technologies can be applied for the recognition of the individual characters whether machine printed or handwritten.

Intelligent Character Recognition (ICR) technology recognizes isolated characters by distinguishing the individual shapes and sizes within each character classifier—identifying extracted features such as curves, loops and lines—and organizing them in a logical and actionable manner.

Intelligent Word Recognition (IWR) recognizes data at the word or "field" level. IWR engine is capable, in fact, of extracting all types of field-based information—either constrained (machine print, hand-printed capitals) or unconstrained (freeform handprint, cursive) from virtually any type of document.

The use of OCR, ICR, and IWR technology identifies, e.g., critical payment information quickly, accurately and securely. Handwritten words are classified by using IWR technology, while its OCR and ICR technologies identify key information based on individual characters whether handwritten or machine printed capturing and recognizing the data found on each payment document.

To accomplish the level of recognition required for the market, the recognition engine 406 should be trained on hundreds of thousands of character images from, e.g., actual handwritten checks.

Again, multiple OCR algorithms, e.g., 2 to 4 algorithms, can be used at the character recognition level. For example, two complementary word recognizers can be used at the word level, and two chains of courtesy and legal amount recognition support the amount recognition level as described above. The results of these complementary recognitions are then integrated by the combination of output candidate lists of the individual recognizers and producing a new single output list. Even the individual integrators can be built on the principle of complementarity, i.e., both the log-liner rule and a neural network can be used.

Check Fraud Detection

Check fraud detection generally consists of two phases: Profile Building—this step is when Profiles are created using valid check images provided by the customer and based on routing and account numbers; and Scoring—incoming images are verified against the existing Profile for the account associated to the check.

Figure 6:
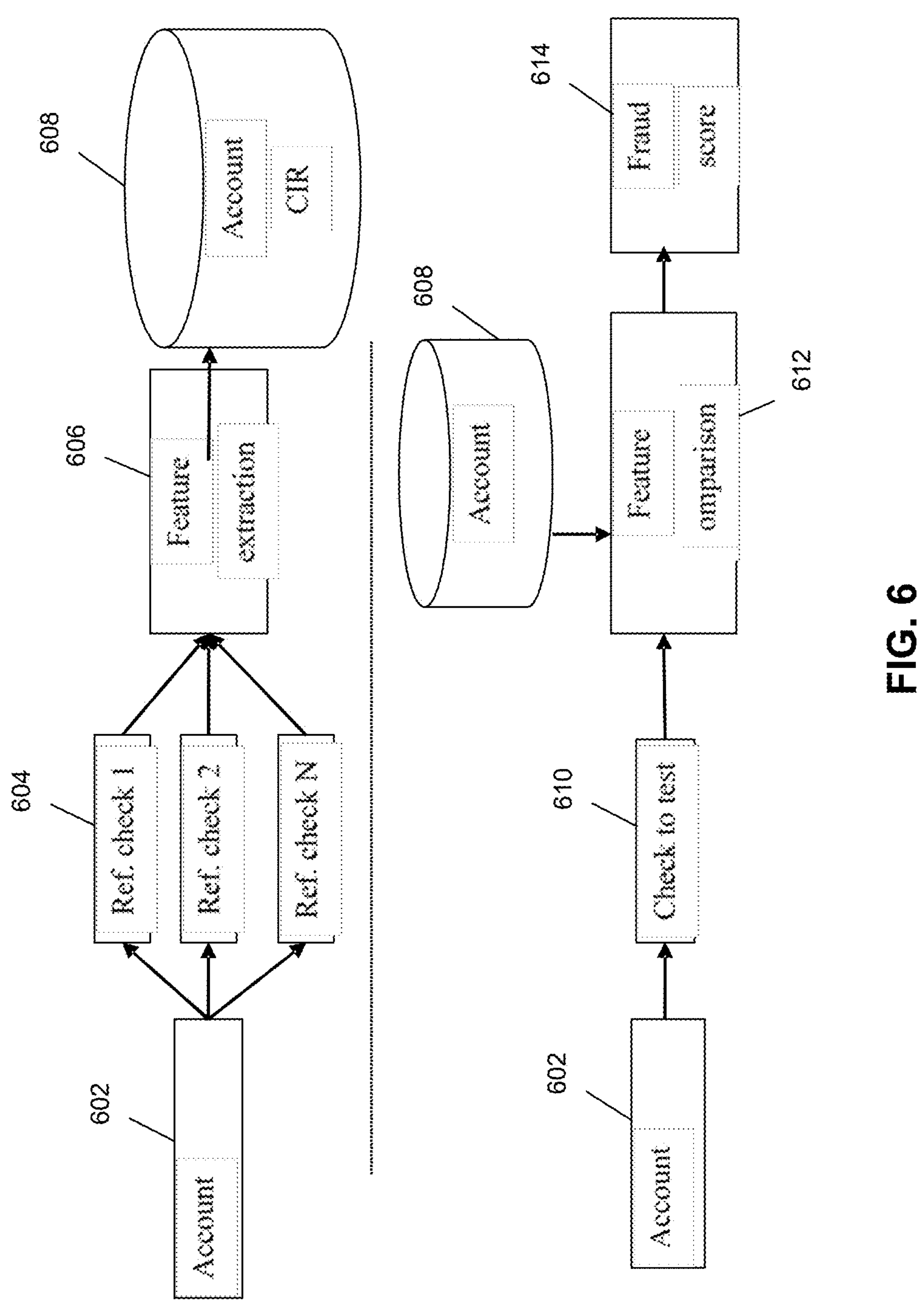
FIG. 6 illustrates an example fraud detection process, according to an embodiment.

In certain embodiments, the check fraud detection functionality does not use any IWR methodology, however the check fraud detection functionality can use complementary OCR engines in fraud detectors that cross validate, e.g., the MICR content with check number (see detector 12 below in Table 1) and Neural Network methodology FIG. 6 illustrates and example fraud detection process in according with one example embodiment. At the first phase several samples of valid checks (references) 604 are collected for every account 602. They are processed by engine 406 to extract specific check features 606 that are stored in a CIR (Check Profile) 608 associated with the account 602.

At the second phase, each new incoming check image 610 associated with the account is tested to be a potential fraud. Engine 406 extracts from the incoming check its features (as in step 606) and compares them (612) with features stored in CIR (Check Profile) 608. The result of the comparison is the fraud score 614. If this score is higher than, e.g., a threshold, the check is sent to the potential fraud basket.

In certain embodiments, the following features of reference checks listed in Table 1, which are the same features to be extracted from incoming checks to be tested, can be stored in CIR (Check Profile) 608:

Detectors

TABLE 1

| Test Name | Compare Location | Compare Contents | Brief Description |
|---|---|---|---|
| Courtesy Amount Field | x | | Compares the location of the CAR field to established profile Values |
| Courtesy Sign | x | Image Comparison | Compares the location and image of the Courtesy Amount Sign to established profile Values |
| Legal Amount Field | x | | Compares the location of the LAR field to established profile Values |
| Payee Name Field | x | | Compares the location of the Payee Name field to established profile Values |
| TO THE ORDER OF keyword | x | Image Comparison | Compares the location and snippet of keyword PAY TO THE ORDER OF field to established profile Values |
| Date Field | x | | Compares the location of the Date field to established profile Values |
| Date keyword | x | Image Comparison | Compares the location and pre-printed the keyword Date to established profile Values |
| Payor Address Block | x | | Compares the location of the Payor address block to established profile Values |
| Check Number Field | x | | Compares the location of the Check Number field to established profile Values |
| Reduced Image of Whole Check | | Image Comparison | Reduces the size of the overall check image and compares the overall image to established profile Values |
| Structural Layout | x | | Compares the relative location of pre-printed lines on the checks vs overall established profile Values |
| Comparison of Check Numbers | | | Compares the check number in the bottom code line to the check number on the top right corner of the check |
| LAR Handwriting Style | | Style Comparison | Compares the LAR Handwriting style of the check to established profile Values for certain characters |

TABLE 1-continued

| Test Name | Compare Location | Compare Contents | Brief Description |
|---|---|---|---|
| Payor Name | | Image Comparison | Compares the snippet of Payor Name to established profile Values |
| Signature Detection | | Image Comparison | Compares the Payor Signature on the front of the check to established profile Values |
| MICR Line | x | | Compares the location of the MICR line to established profile Values |
| CAR/LAR Difference | | | Compares the CAR value and the LAR value on the check to see if they match |
| Payee Name Handwriting Style | | Style Comparison | Compares the Payee name handwriting style on the check to established profile Values |

Each set of features can be extracted by its own local fraud detector (not shown) within recognition engine 406, so there can be 18 local detectors in total, where a fraud score 614*n* (where n from 1 to 18—not shown) can be calculated for each.

Feature comparison methods can be based on calculating distances between vectors/sequences/signals. Image Comparison: Image distance is calculated as the Normalized Mean Square Error between two arrays of pixels. Preliminary, both arrays are normalized to have the same sizes. Structural Layout Analysis (Relative Location of Line Objects): is calculated as Edit Distance between sequences of line objects detected in two images. Lines are sorted from top-left to bottom-right, horizontal and vertical lines being considered separately. Handwriting Styles comparison: is calculated as Euclidian distance between vectors of normalized writing characteristics (stroke density, slant, height of ascenders/descenders, size of loops, etc.) Different methods can be used for Handwriting Styles comparison, but a main method can use convolution neural network. Signature comparison: Different methods are used for Signature comparison. Main method uses convolution neural network (CNN).

The Model produces a probabilistic score result for each feature and then generates an overall numerical score result 614 ranging from 0 to 1000. Based on the provided results, the model presents a probabilistic result if the check is valid (belongs to the associated account check stock—which entails a low result score value) or not valid (does not belong to the associated account—which entails a high score value). These results are provided to the customer who then uses their internal system 402 to decide regarding any action taken on the incoming check 610.

The notion and range of what constitutes a 'high' and 'low' score can be determined by the integrator/developer. The principals for calculating the individual and global score are described below.

2.1.1. (c) Fraud Score Calculation

Fraud score of the incoming check 610 can be calculated by comparing its data with data of reference checks 604 from the CIR 608. For each reference check from the CIR, fraud score is calculated. If $G_j$ is fraud score for j-th reference check from the CIR 608. Global fraud score of incoming check is the minimum among $G_j$. The $G_j$ is calculated in two steps:

STEP 1: Local fraud score $S_i$ i=1-18 is evaluated by each of the, e.g., 18 local detectors. For most local detectors, this local fraud score is the function of the distance between the feature vector $F_i$ of the incoming check and feature vectors $R_{ij}$ of j-th reference checks in the CIR 608:

$S_i=f(F_i-R_{ij})$, i—local detector number, j—reference checks number in the CIR 608.

Function $f$ is chosen so that the local score $S_i$ of the i-th local detector is in the interval from 0 to 1. For example, $f(x)=\exp(-x*a)$, a being a normalization factor chosen manually. For example, consider the calculation of Score of a single detector. Assume that we consider the Position of Courtesy Amount (feature #1). Each reference check 604 has its own Courtesy Amount position (X/Y coordinate, W/H Width and Height measurement), so it can be represented as a point in a two-dimensional coordinate space with X/Y coordinates and W/H measurement. When the incoming check 610 comes to test, recognition engine 406 can calculate the position of Courtesy Amount and maps its point to the same feature space with its X/Y coordinates and W/H measurement.

Then distance d between points of incoming test check and j-th reference check are measured. This distance is the only value that defines the score of the detector:

$$Si=f(d)$$

The function $f$ is selected so that the value S is in the interval from 0 to 1. It is monotone, so the larger is d, the higher is fraud score, i.e. the more probable the incoming check 610 is a fraudulent. When d=0, S=0 i.e. incoming check 604 is identical with a certain reference check.

SECOND STEP: Fraud score $G_j$ for j-th reference check 604 from the CIR 608 is calculated. A Perceptron neural network can be used for $G_j$ calculation. Inputs for this NN are local fraud scores Si of local detectors, i=1-18. Another input for the NN is normalized weighted product of local fraud scores of local detectors. And another input is score of printing of incoming check. Output of the NN is fraud score $G_j$ for j-th reference check from the CIR 608.

The lower fraud score $G_j$, the more j-th reference check from the CIR 608 resembles the incoming check. The global fraud score 614 of incoming check 610 is the minimum among $G_j$, i.e., the reference check 604 that most closely resembles the incoming check 610 is found. The higher global fraud score, the more probable incoming check is a fraud.

3.0 Visualization

Because the, e.g., 18 detectors above are each evaluated and scored separately, a visualization overlay can be generated and customized according to business rules defined by the customer to allow quick and easy visualization of potential issues with a new check 610. It should be noted that other potential detectors can include font differences, security features, borders and back of the check matching. In fact, Table 2 includes a list of additional potential detectors:

TABLE 2

| Check Image Fraud Detector Roadmap Opportunities | Description |
|---|---|
| Variation in location of signature | Determining coordinates of location on the signature located on the signature line |
| Check Border Variation | Evaluate Border structures to determine variation in border |
| Font differences in Check printed fields - Determine standard font in customers standard documents/image - create a verification of these printed fonts and determine variances in the printed font | |
| Payor block line count differences | Determine number of lines in standard behavior of a profile and compare for differences |
| Back of check variation (is this back the right back of check that matches the front of check) | Determine standard back of check "matching" from front of check. Create a profile for front/back matching of check behavior and determine if front/back match/does not match and create a score |
| Security Features | Determine location of "security features" on a given check. Ex position of "lock" icon. Position of security verbiage" position of other security feature icons. Store those locations and security icon analysis and when new check comes in compare to profile and create a score |
| Back of check variation in handwriting/font type signatures or deposit only messages | behavior in handwriting style/font styles to Create profile of typical back of check determine if back matches/does not match profile and create a score |

As mentioned above, user application 402 can comprise a user interface (not shown) that allows customers to verify fraud. The application 402 can then allow the user to define and set bank specific business rules, review suspect checks 610 as determined based on the rules, and then quickly decide whether an item is fraud or not. The system 400 can also generate the output needed for bank posting systems, reports, allow for compromised data searches and data/trends analysis, some of which is described below.

Business Rules Descriptions: Business rules allow customers to apply "rules" to their volume to determine the documents (checks) they want to review for potential fraud or other check verification. Rules that can be applied include ALL elements of a check: Routing Number, Account Number, Dollar Amt. Date, Payee/Payor, etc., as well as all of the other detectors.

Figure 7:
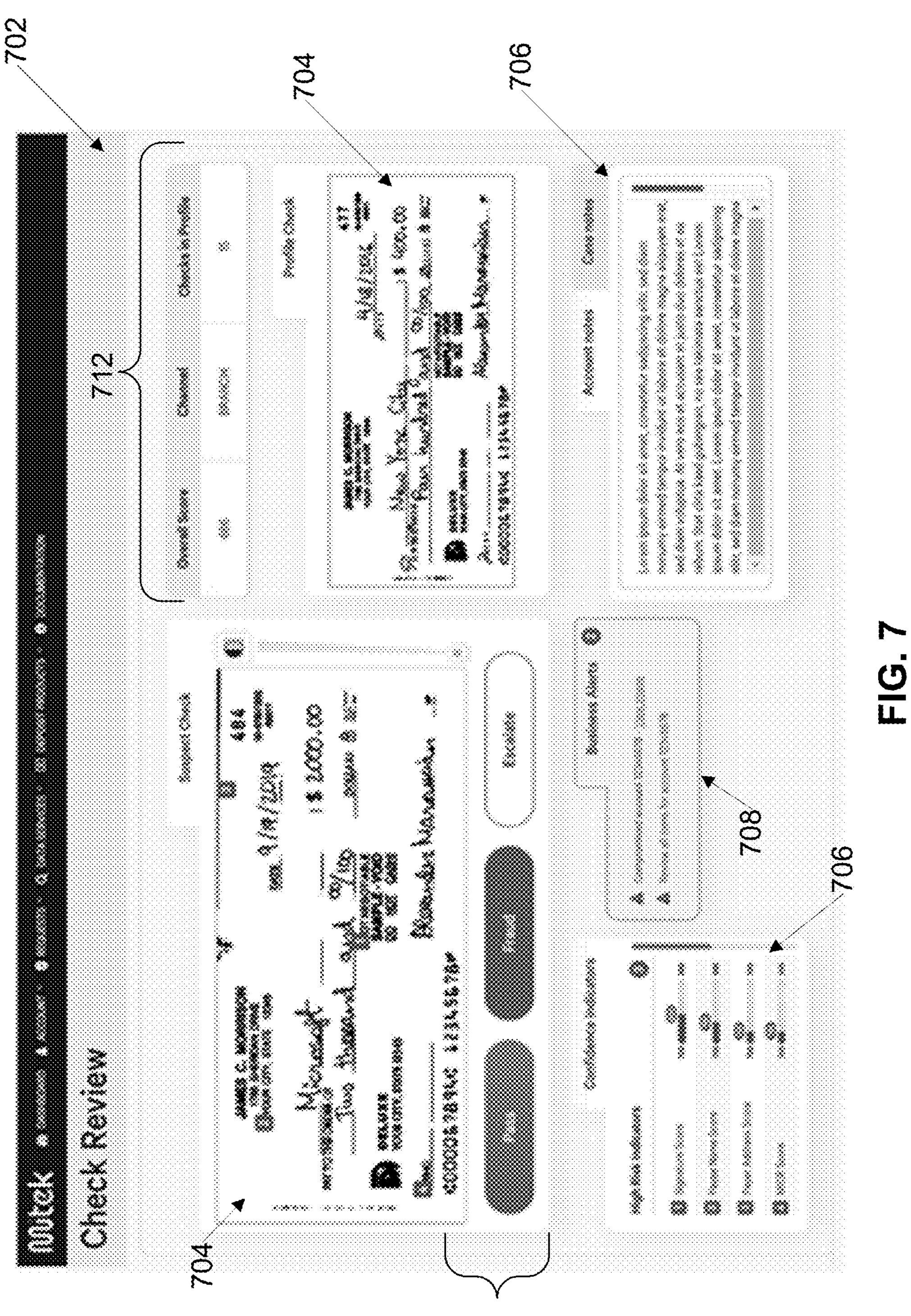
FIG. 7 illustrates an example view of a user interface that can be included in the system of FIG. 4, according to an embodiment.

FIG. 7 illustrates an example view of the user interface 702. As can be seen, user interface 702 can be configured to show the image 704 of the suspect check 610 with areas highlighted, in the case as numbers 1-4, in accordance with the business rules. In this case below, the check image 704 are confidence indicators in area 706 associated with those highlighted areas (1-4), which allows the user to quickly assess the risk associated with these areas or aspects of the check 610. Also, in this case, below the image 610 is a business alerts area 708 that can provide information related to an account associated with the check image 610.

Buttons or other selectors/inputs 710 can then be provided to allow the reviewer to quickly approve or decline the check or escalate the review in this example.

Other information that can be provided to allow a quick, efficient, and effective review include information on the overall or global score of the image, the channel on which it was received, the number of checks in the related CIR 608, in area 712; an image of a profile check 714 that can be used to visually contrast and compare; and a notes section 716.

The User Interface screens allow for quick review and decisioning of fraud suspects. The unique key features include highlight boxes for high score differences areas, e.g., 1-4, which can be based on XY coordinates on the check "location" based on system ability to detect coordinates and areas on the image/document.

Figure 8:
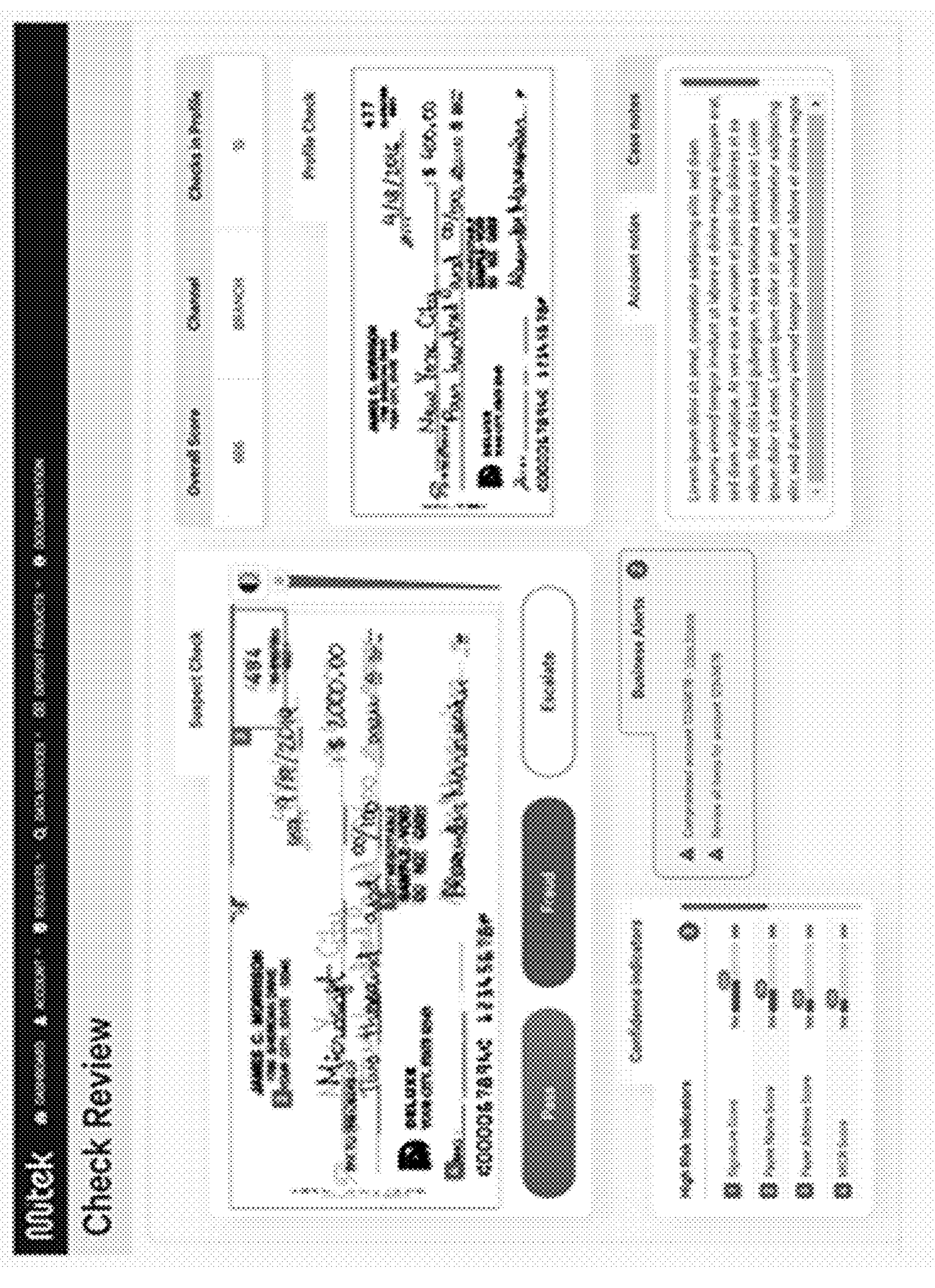
FIG. 8 illustrates an example view of a user interface that can be included in the system of FIG. 4, according to an embodiment.
Figure 9:
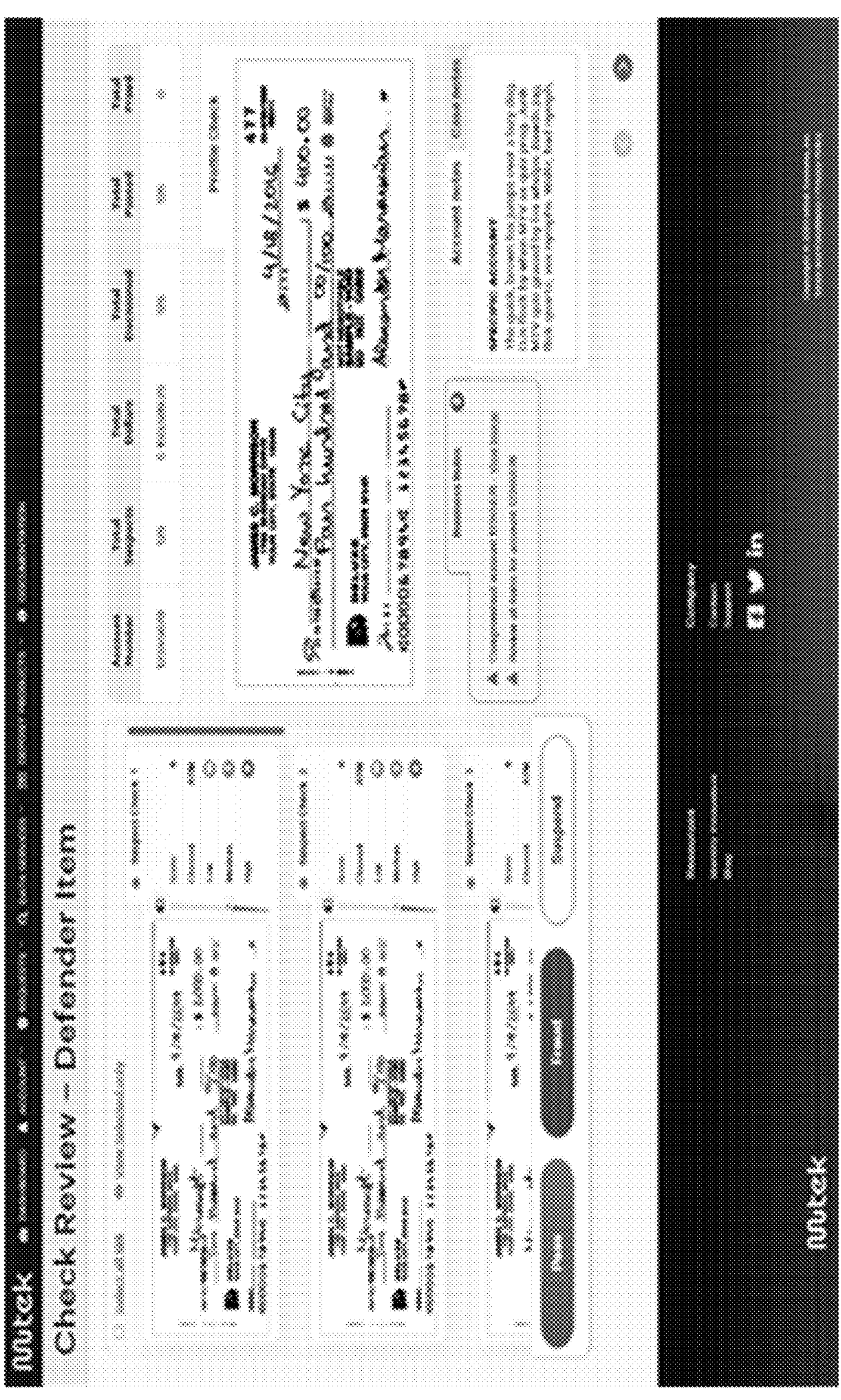
FIG. 9 illustrates an example view of a user interface that can be included in the system of FIG. 4, according to an embodiment.

Moreover, the application 402 can enable image overlay image 610 over, e.g., a best profile candidate as illustrated in FIG. 8. The user interface can also provide the ability to review single items or multiple items for a particular account at one time based on business rules as illustrated in FIG. 9.

Figure 10:
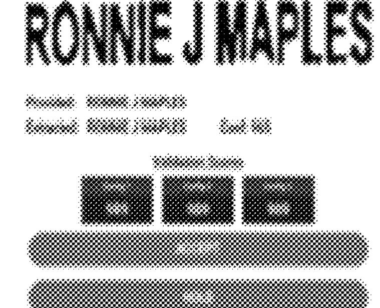
FIG. 10 illustrates an example view of a user interface that can be included in the system of FIG. 4, according to an embodiment.
Figure 10:
Figure 11:
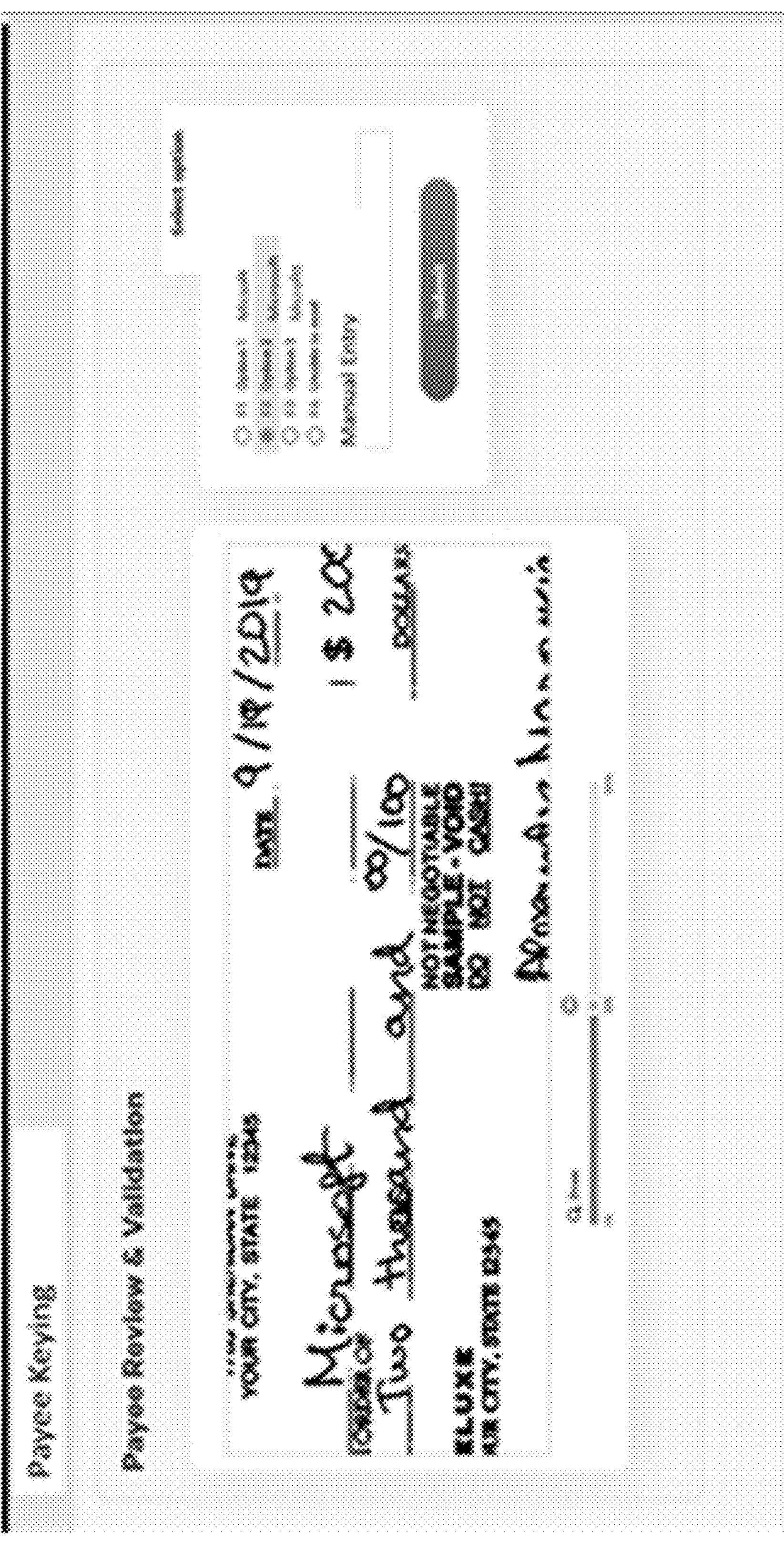
FIG. 11 illustrates an example view of a user interface that can be included in the system of FIG. 4, according to an embodiment.
Figure 12:
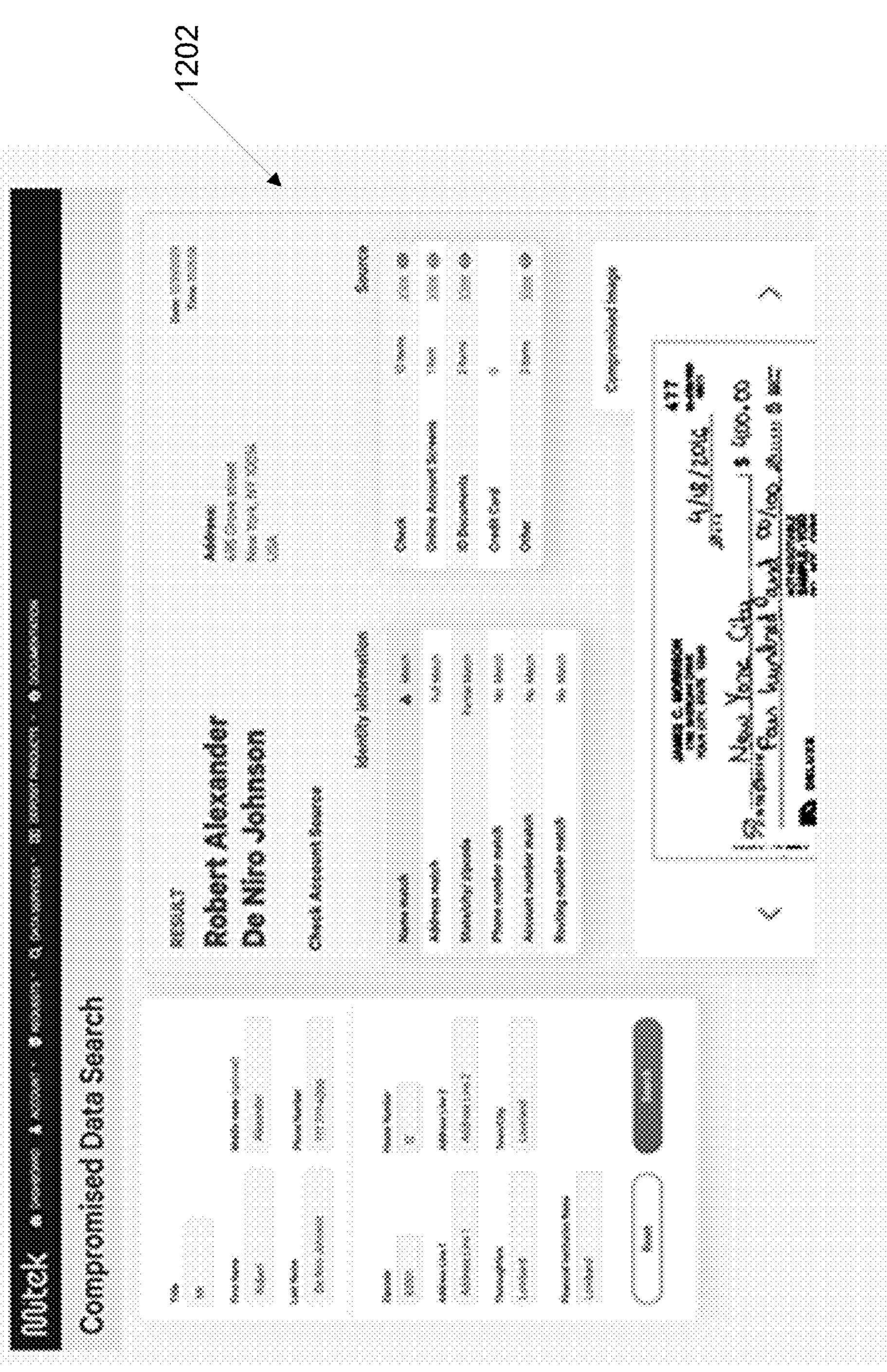
FIG. 12 illustrates an example view of a user interface that can be included in the system of FIG. 4, according to an embodiment.

Payee keying can also be enabled via application 402 through the user interface. For example, application 402, in conjunction with the backend system can search for a Payee/Payor and lift that information to be used as data. This data can be presented to a bank so that they can confirm or correct the data. As illustrated in FIG. 11 this data can then be submitted for review and validation. One type of validation, if images of the back of the check are obtained is to see validate whether the payee information matches the signature on the back or payee information on the back of the check. The payee data can also, for example, be matched to payee data associated with the deposit account. The user interface can then comprise a screen 1002 as illustrated in FIG. 10 that allows the user to accept or hold the deposit based on this information.

The application 402 in combination with the user interface can also allow a compromised data search as illustrated by screen 1202. The compromised database includes documents that are "stolen" for sale items that may cause fraud or risk to an individual. These documents can include checks, IDs, Account Screens etc., These can be pictures with multiple items/images imbedded in them. The items and images can be split into management data elements/images that can be processed through our Check Intelligence technology to extract data from the image-extractions such as customer name, address, account, numbers, dollars, bank etc. Anything that can be extracted and stored from the image. This data is then consumed and compared to the customer data/customer account data and profiles in the Check Fraud Defender Consortium. If there is a match, we can provide a "flag" indicator in the check fraud suspect review process, the Identity verification process AND also allow banks the ability to do customer name. Bank and other field searches to determine if a person/and or customer is at risk of compromised or has been compromised.

4.0 Account Level

The consortium concept is that backend 404 can be part of a larger platform 110 that handles the above functionality and features for a plurality of entities. Thus, platform 110 has the ability to look across user populations for that plurality of entities and link information to a particular user to be used for fraud detection. For example, if a particular user has accounts with multiple entities. Thus, platform 110 can look at account activity across those multiple entities and if fraud is detected with one account, factor that information in when looking at transactions related to other accounts with other entities. As such, even though the transaction information and analysis for one account with one entity may look fine. But fraud risk factors with other accounts may be increasing, or fraud actually detected that can be used for heightened or predictive analysis with respect for that one account.

For example, platform 110 may detect that transaction, e.g., check writing velocity with respect to one account is accelerating abnormally. And it should be noted that the accounts do not all need to be checking accounts and the transaction do not all need to be check cashing transactions. For example, one ore more of the accounts may be a credit card account or other financial account. Thus, the abnormal transaction velocity may be related to credit card chargers. Or the abnormality may be charges in a location or amounts that are not normal, transaction sin a particular day or time period, transaction channel, i.e., ATM, branch or location, mobile, etc. This abnormal information can then be used to increase scrutiny with respect to other accounts.

In general, it should be pointed out that information such as transaction velocity and abnormal amounts or transaction locations, can be used for a single account as well. But in general, these types of abilities allow analysis at an account level as opposed to simply on a transaction level. In other words, while a particular transaction may look fine, in the broader context of an account or accounts, it may be suspicious, i.e., an amount out of a normal range, high velocity, or even just being tied to a user identification that is known to have been compromised. Identities that have been compromised or are tied to fraud can also be used to warn entities with respect to opening new accounts related to such entities.

As such, a customer has increased capabilities with respect to business alerts that can be set up.

5.0 Example Implementation Based on Business Rules

In this implementation, there are two queues:

Queue 1—Defender Queue

Queue 2—Single Item Review Queue

Note: An item can only be in one queue. Once an item is put into the Defender queue it cannot be put in the Single Item Review queue. Rules should be applied to the items in the Defender queue, so they are marked with the appropriate Alert Reasons.

Note: Day is a 24-hour period in which the input files are processed and defined by a specific start and end time.

Use Case 1—Defender Items

All items for accounts that have over XX suspects Within a specific polling of items Map to: Defender Queue Alert Reason: High Volume Use Case 2—Fraud Items All items with specific high scores.

Filter 1—Need to include all items over XX dollars (Low Dollar Threshold) This is set in the business rules Filter 2—Need to include items only from specific channels or all channels (ATM, Mobile, Branch, etc.)—So channel should be added as a selection in the rules base The channels are defined in CFD Filter 3—Need to include items with Overall Score over XXX Filter 4—Need to include items with selected Detector Scores over XXX Map to: Single Item Review Queue Alert Reason: Fraud Item Use Case 3—High Dollar Items Any item over XX dollars regardless of scores.

Filter 1—Need to include all items over XX dollars (High Dollar Threshold)

Filter 2—Need to include items only from specific channels or all channels (ATM, Mobile, Branch, etc.)

Map to: Single Item Review Queue provide a Defender Queue Option send all High Dollar items to the Defender Queue?

Alert Reason: High Dollar Item

Use Case 4—Liveness Items

All items that are considered "Live" or captured from screens.

Filter 1—Need to include all items over XX dollars (Low Dollar Threshold)

Filter 2—Need to include items only from specific channels or all channels (ATM, Mobile, Branch, etc.)

Filter 3—Need to include items with that have a Liveness Detection Score>XXX

Map to: Single Item Review Queue

Alert Reason: Liveness Item

Use Case 5—MICR Anomaly Items

All items that with a high MICR extraction score but no matching account.

Filter 1—Need to include all items over XX dollars (Low Dollar Threshold)

Filter 2—Need to include items only from specific channels or all channels (ATM, Mobile, Branch, etc.)

Filter 3—Need to include items that do not have a matching account.

Map to: Single Item Review Queue

Alert Reason: MICR Anomaly Item

Use Case 6—PAD Suspect

All items that are identified as PADs and considered suspect.

Filter 1—Need to include all items over XX dollars (Low Dollar Threshold)

Filter 2—Need to include items only from specific channels or all channels (ATM, Mobile, Branch, etc.)

Filter 3—Need to include items identified as PAD.

Filter 3—Need to include items with Overall Score over XXX

Filter 4—Need to include items with selected Detector Scores over XXX

Map to: Single Item Review Queue

Alert Reason: PAD Suspect Item

Use Case 7—IRD Suspect Items

All items that are identified as IRDs and considered suspect.

Filter 1—Need to include all items over XX dollars (Low Dollar Threshold)

Filter 2—Need to include items only from specific channels or all channels (ATM, Mobile, Branch, etc.)

Filter 3—Need to include items identified as IRD.

Filter 3—Need to include items with Overall Score over XXX

Filter 4—Need to include items with selected Detector Scores over XXXMap to: Single Item Review Queue Alert Reason: IRD Suspect Item Use Case 8—ATM Fraud Items (Example Fraud Scenario)

All ATM Items between $300 and $400.

Filter 1—Need to include all items between XX and XX dollars.

Filter 2—Need to include items from ATM channel.

Filter 3—Need to include items with Overall Score over XXX

Filter 4—Need to include items with selected Detector Scores over XXX

Map to: Single Item Review Queue

Alert Reason: ATM Fraud Item

Use Case 9—Mail Fraud Items (Example Fraud Scenario)

All items with high Payee Name HW Style Score

Filter 1—Need to include all items over XX dollars (Low Dollar Threshold)

Filter 2—Need to include items only from specific channels or all channels (ATM, Mobile, Branch, etc.)

Filter 3—Need to include items with that have a Payee Name HW Style Score>XXX

Map to: Single Item Review Queue

Alert Reason: Mail Fraud Item

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:

receive an incoming check image associated with an account;

for each of one or more profile check images stored in a Check Identity Record (CIR) associated with the account, for each of a plurality of detectors, extract one of a plurality of features, that is associated with the detector, from the incoming check image, compare the extracted feature with a corresponding feature associated with the profile check image, and;

determine a local fraud score for the detector based on the comparison, retrieve information related to one or more other accounts linked owned by a same entity as the account, wherein the retrieved information indicates whether or not an abnormality has been detected in the one or more other accounts, and determine a global fraud score for the profile check image based on the local fraud scores for the plurality of detectors and the retrieved information;

determine a best matching one of the one or more profile check images based on the global fraud score for each of the one or more profile check images; and when the global fraud score for the best matching profile check image satisfies a threshold, generate and display a graphical user interface that comprises an overlay of the incoming check image over the best matching profile check image, wherein at least one of the plurality of features, that is associated with one of the plurality of detectors for which a highest local fraud score was determined for the best matching profile check image, is highlighted within the overlay of the incoming check image, and wherein the graphical user interface further comprises a first input that, when selected by a user, approves a deposit of the incoming check image, and a second input that, when selected by the user, declines a deposit of the incoming check image.

2. The method of claim 1, wherein the graphical user interface further comprises a third input that, when selected by the user, escalates a review of the incoming check image.

3. The method of claim 1, wherein the graphical user interface further comprises one or more business alerts associated with the account in a same screen as the overlay of the incoming check image.

4. The method of claim 1, wherein the graphical user interface further comprises the global fraud score for the best matching profile check image, a channel on which the incoming check image was received, and a number of the one or more profile check images in the CIR.

5. The method of claim 1, wherein the one or more other accounts include at least one of a checking account or credit card account.

6. The method of claim 1, wherein the one or more other accounts include a checking account, and the abnormality comprises an acceleration in check writing from the checking account.

7. The method of claim 5, wherein the abnormality comprises an amount that has been charged to the at least one of the checking account or credit card account.

8. The method of claim 5, wherein the abnormality comprises a location at which a charge to the at least one of the checking account or credit card account has occurred.

9. The method of claim 5, wherein the abnormality comprises a transaction channel in which a charge to the at least one of the checking account or credit card account has occurred.

10. The method of claim 5, wherein the abnormality comprises a time period during which a charge to the at least one of the checking account or credit card account has occurred.

* * * * *